US007013432B2

(12) United States Patent
Taylor et al.

(10) Patent No.: US 7,013,432 B2
(45) Date of Patent: *Mar. 14, 2006

(54) DISPLAY CONTAINER CELL MODIFICATION IN A CELL BASED EUI

(75) Inventors: Steve D. Taylor, Lake Oswego, OR (US); Axel M. Koenig, Portland, OR (US)

(73) Assignee: Broadband Graphics, LLC, Lake Oswego, OR (US)

( * ) Notice: Subject to any disclaimer, the term of this patent is extended or adjusted under 35 U.S.C. 154(b) by 724 days.

This patent is subject to a terminal disclaimer.

(21) Appl. No.: 10/136,679

(22) Filed: Apr. 30, 2002

(65) Prior Publication Data

US 2002/0196287 A1 Dec. 26, 2002

Related U.S. Application Data

(60) Provisional application No. 60/287,933, filed on Apr. 30, 2001, provisional application No. 60/287,972, filed on Apr. 30, 2001, provisional application No. 60/287,663, filed on Apr. 30, 2001, provisional application No. 60/287,943, filed on Apr. 30, 2001, provisional application No. 60/287,980, filed on Apr. 30, 2001, provisional application No. 60/287,977, filed on Apr. 30, 2001, provisional application No. 60/287,932, filed on Apr. 30, 2001.

(51) Int. Cl.
*G06F 15/00* (2006.01)

(52) U.S. Cl. ........................ 715/788; 715/809

(58) Field of Classification Search ................ 715/788, 715/854, 809
See application file for complete search history.

(56) References Cited

U.S. PATENT DOCUMENTS

| 4,890,098 | A |   | 12/1989 | Dawes et al. |
|-----------|---|---|---------|--------------|
| 5,600,346 | A |   | 2/1997  | Kamata et al. |
| 5,621,904 | A |   | 4/1997  | Elliott et al. |
| 5,850,548 | A | * | 12/1998 | Williams ................ 717/107 |
| 5,886,694 | A | * | 3/1999  | Breinberg et al. .......... 715/788 |
| 5,903,466 | A |   | 5/1999  | Beausang et al. |
| 6,008,809 | A |   | 12/1999 | Brooks |
| 6,252,589 | B1 |  | 6/2001  | Rettig et al. |
| 6,281,876 | B1 |  | 8/2001  | Jones, Jr. |

* cited by examiner

*Primary Examiner*—Cao (Kevin) Nguyen

(57) ABSTRACT

In a cell based EUI, existing display container cells nested within a "host" display container cell are automatically shifted and/or downsized, if necessary, to increase available space to facilitate the creation of another display container cell nested within the "host" display container cell, in response to a request to perform the creation. Similar shifting and/or downsizing are performed to facilitate expansion of one of the nested display container cells; and shifting and upsizing are performed to facilitate contraction of one of the nested display container cells. In one embodiment, shifting and/or downsizing/upsizing are performed in view re-sizing priorities of the display container cells and attributes of a host display container cell governing placement and/or alignment of immediately nested display container cells. In one embodiment, an efficient extended boundary method is employed.

13 Claims, 19 Drawing Sheets

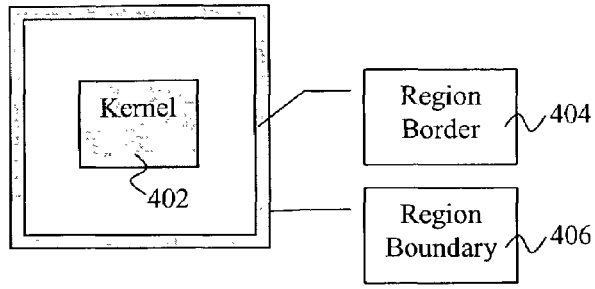

REGION ATTRIBUTES region_name = [ ]
region_adaptive_mode = [auto_expansion_mode, default_size_mode or replace_lowest_priority_zone]
region_type = [ dynamic, fixed ]
region_position = [ movable, stationary ]
region_zone_list = [ zone_names, none ]
region_zone_alignment = [ center, top, bottom, right, left ]
region_base = [ ]
region_height = [ ]
region_center_position = [ x, y ]
region_maximum_size = [ ]
region_background = [ ]
region_border_texture_on = [ Y, N ]
region_texture =[ options ]
region_max_allowable_zones = [ ]
region_kernel_area = [ ]
region_kernel_base = [ ]
region_kernel_height = [ ]
region_border = [ Y, N ]
region_border_thickness = [ ]
region_border_color = [ options ]
region_border_texture_on = [ Y, N ]
region_border_texture = [ options ]
region_border_shading_on = [ Y, N ]
region_border_shading = [ options ]
region_border_blinking = [ Y, N ]
region_border_transparent = [ Y, N]
region_boundary:
region_boundary_thickness = [ ]
region_boundary_color = [ options ]
end_of_region_name

Figure 4

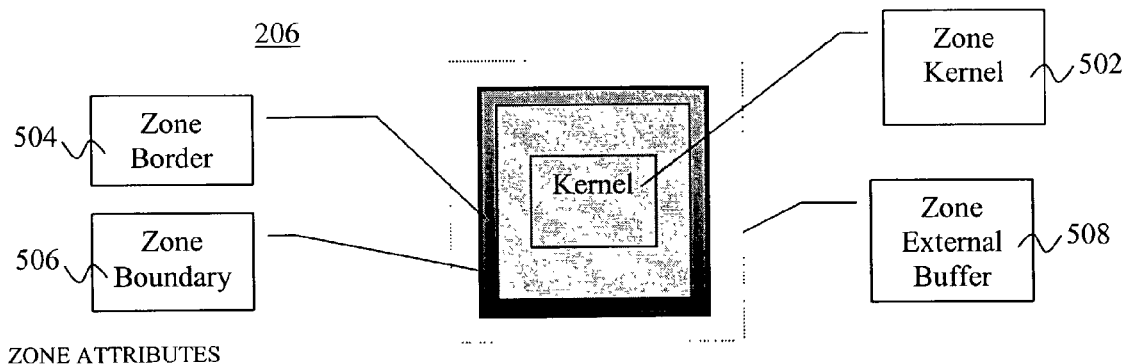

ZONE ATTRIBUTES zone_name = [ ]
zone_type:
zone_type_video = [ Y, N ]
zone_type_data = [ Y, N ]
zone_type_image = [ Y, N ]
    zone_type_text = [ Y, N ]
zone_region_association = [ region_name, options ]
zone_priority_level = [ 1, 2, 3 ]
zone_center_position = [ x, y ]
zone_center_position_default = [ region_name, region_center_position ]
zone_overlap = [ Y, N ]
zone_base = [ ]
zone_height = [ ]
zone_upper_left_vertex = [ x, y ]
zone_maximum_size = [ ]
zone_frozen = [ Y, N ]
zone_fixed = [ Y, N ]
zone_position = [ movable, stationary ]
zone_kernel:
    zone_kernel_base = [ x ]
    zone_kernel_height = [ x ]
zone_border = [ Y, N ]

zone_border_thickness = [ ]
zone_border_color = [ options]
zone_border_texure_on = [ Y, N ]
zone_border_texture = [ options ]
zone_border_shading_on = [ Y, N ]
zone_border_shading = [ options ]
zone_border_blinking = [ Y, N ]
zone_border_skin = [ list: option_names, null ]
zone_border_data_layer = [ attachable_data_base_name ]
zone_border_data_layer_font_size = [ font_size ]
zone_border_data_layer_font_size_minimum = [font_size ]
zone_border_data_layer_font_size_maximum = [font_size ]
zone_border_data_layer_position = [ top/left, bottom/left ]
zone_border_button_icon = [ button_icon_name ]
zone_border_button_icon = [ top/right, bottom/right ]
zone_boundary:
zone_boundary_thickness = [ ]
zone_boundary_color = [ options ]
zone_external_buffer:
zone_external_buffer_height = [ ]
zone_external_buffer_base = [ ]
end_of_zone_name

Figure 5

ICON ATTRIBUTES image_icon_name = [ ]
image_icon_type = [ none, image_icon_type_name ]
image_icon_name_association = [ zone_name ]
image_icon_center_position = [ x, y ]
image_icon_actual = [ bit_map_name ]
image_icon_buffer_base = [ ]
image_icon_buffer_height = [ ]
image_icon_upper_left_vertex_position = [ x, y ]
image_icon_association = [ region, zone, none, attached, button ]
end_of_image_icon_name

UNIVERSAL REGION

- Clear
- Contract
- Expand
- Remove
- Set Attributes

REGION/SUB-REGION

- Same As Universal Region Plus
- Create & Delete

ZONE

- Same As Region Plus
- Move & Place

ICON

- Same As Zone
- Minus Contract & Expand
- Plus Launch

Figure 7

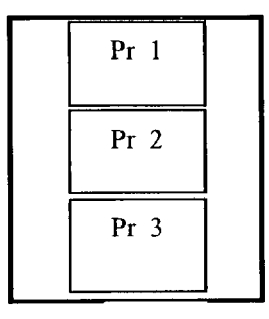 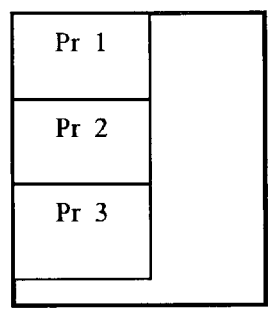 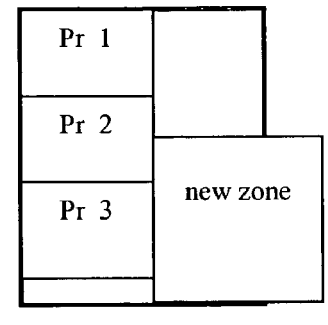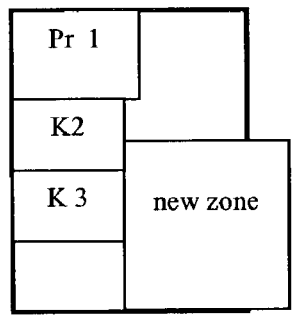 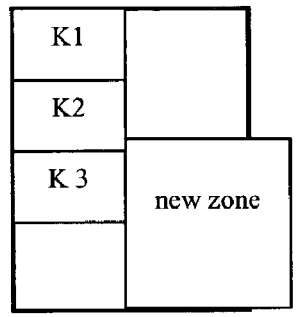 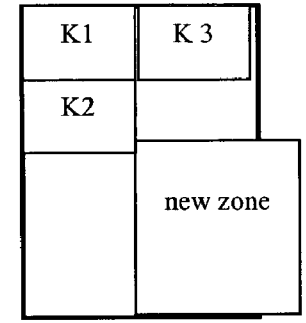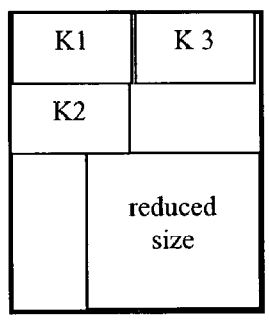 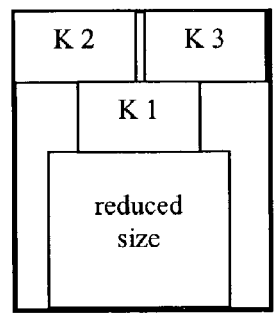 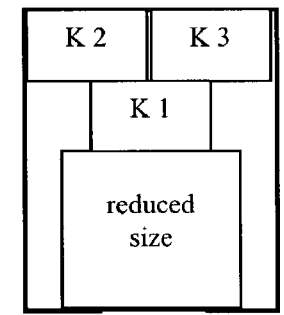
Figure 14

DISPLAY CONTAINER CELL MODIFICATION IN A CELL BASED EUI

RELATED APPLICATIONS

This application relates to, and claims priority to the below enumerated U.S. Provisional Patent Applications:

a) Ser. No. 60/287,933, entitled "A MULTI-WINDOW EUI FOR MULTI-MEDIA CONTENT/PROGRAMMING DELIVERY INCLUDING AUTOMATIC RELATIVE RESIZING", b) Ser. No. 60/287,292, entitled "HIERARCHICAL ELEMENTAL STRUCTURE IN SUPPORT OF A MULTI-WINDOW EUI", c) Ser. No. 60/287,663, entitled "BEHAVIOR OF NESTED COMPLEX ELEMENTS", d) Ser. No. 60/287,943, entitled "STATE TRANSITION FOR A MULTI-WINDOW EUI WITH HIERARCHICAL ELEMENTS", e) Ser. No. 60/287,980, entitled "EFFICIENT REGION IMPACT DETERMINATION FOR MULTI-WINDOW EUI", f) Ser. No. 60/287,977, entitled "REGIONS AND ZONE MODIFICATION FOR A MULTI-WINDOW EUI", and g) Ser. No. 60/287,932, entitled "EXPANDABLE CONTROL FACILITY FOR AN END USER INTERFACE";

all filed Apr. 30, 2001, and which specifications are all hereby fully incorporated by reference.

BACKGROUND OF THE INVENTION

1. Field of the Invention

The present invention relates to the field of data processing. More specifically, the present invention relates to end user interfaces.

2. Background Information

With advances in integrated circuit, microprocessor, networking and communication technologies, an end user of a properly equipped television set or a computing device may receive and consume a variety of multi-media contents or programming via a number of different delivery channels. The end user may e.g. receive and consume television programming delivered through conventional network broadcast, cable or satellite. The end user may also receive and consume various multi-media contents or programming delivered from various recorded media players, such as VCR tape players, CDROM or DVD players. Alternatively, the end user may also receive and consume various streaming multi-media contents or programming delivered through the Internet or other high-speed digital channel.

The end user interfaces (EUI) employed in these multi-media content or programming deliveries are typically limited in their functionalities and ease-of-use. In particular, they are typically fixed or inflexible, i.e. non-responsive or lack interactivity with the user. For example, in the case of television programming, typically only a single view of a program (chosen by a director) is provided to the end user (even though multiple views are available from the multitude of cameras employed to cover an event or performance). Even at times, when multiple views of a program are provided, the user is unable to change the size, and/or placements of the different display windows within which the views are displayed. Where modifications of the size and/or placement of the display windows are supported (hereinafter, simply windows), typically, automatic relative re-sizing and/or placement of the windows are not supported. That is, expansion of a window will often result in the blocking of another window (unless the expanding window is a "transparent" window), and contraction of a window will often result in excess unconsumed space (unless the end user takes overt action to enlarge another window). Similar limitations exist in the delivery of multi-media contents or programming from recorded media or streaming through the Internet.

Further, the different windows (whether it is of the same program or of different programs) are usually not easily interchangeable. In particular, associated controls, such as "minimize", "maximize", or task bars, are typically not relocatable from one window associated with one application to another window associated with another application. For example, in the case of television programming, different views of the same program delivered through multiple windows are generally not interchangeable, whereas different programs delivered through different windows, such as a primary view and a "picture-in-picture" (PIP) view, are swappable, provided the end user separately changes the channels associated with the two windows. In the case of windowed applications, control facilities associated with windows of an application, such as "minimize", "maximize" or task bars, are typically fixed with the corresponding windows and/or the application, and may not be moved and be associated with another window and/or another application.

Thus, an improved end user interface for content or programming delivery is desired.

BRIEF DESCRIPTION OF DRAWINGS

The present invention will be described by way of exemplary embodiments, but not limitations, illustrated in the accompanying drawings in which like references denote similar elements, and in which:

FIGS. 4–5 illustrate selected aspects of the composition of a "container" cell, including a region cell and a zone cell, in accordance with one embodiment;

FIG. 7 enumerates selected methods associated with the various implementation cells to support the practice of the present invention, in accordance with one embodiment;

FIGS. 13–14 further illustrate automatic relative re-sizing or re-placement of region cells and zone cells, in accordance with one embodiment;

DETAILED DESCRIPTION OF THE INVENTION

The present invention includes a hierarchical cell based end user interface, having hierarchically organized display cells (hereinafter, simply cells). The present invention also includes processes for the end users to interact with the interface, having particular application to the delivery of multi-media programming and/or content, as well as processes for automatically re-sizing and/or repositioning cells of the EUI.

In the following description, various aspects of the present invention will be described. However, the present invention may be practiced with only some or all aspects of the present invention. For purposes of explanation, specific numbers, materials and configurations are set forth in order to provide a thorough understanding of the present invention. However, the present invention may be practiced without the specific details. In other instances, well-known features are omitted or simplified in order not to obscure the present invention.

Terminology

Parts of the description will be presented in data processing terms, such as data, variables, methods, requests, returns, and so forth, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical, electrical and/or optical components of a computer system.

The term "display cell" (or "cell" for short) as used herein refers to the logical elements or items employed to collectively implement the various aspects of the EUI. The logical elements/items or cells, as will be described more fully below, are typed and include attributes defining them, including their manifestation and behaviors. Visually, cells may be "nested" within one another. Organizationally, cells may be hierarchically related to each other.

The term "computer system" as used herein includes general purpose as well as special purpose data processing machines, systems, and the like, that are standalone, adjunct or embedded.

Section Headings, Order of Descriptions and Embodiments

Section headings are merely employed to improve readability, and they are not to be construed to restrict or narrow the present invention.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may.

End User View

Figure 1:
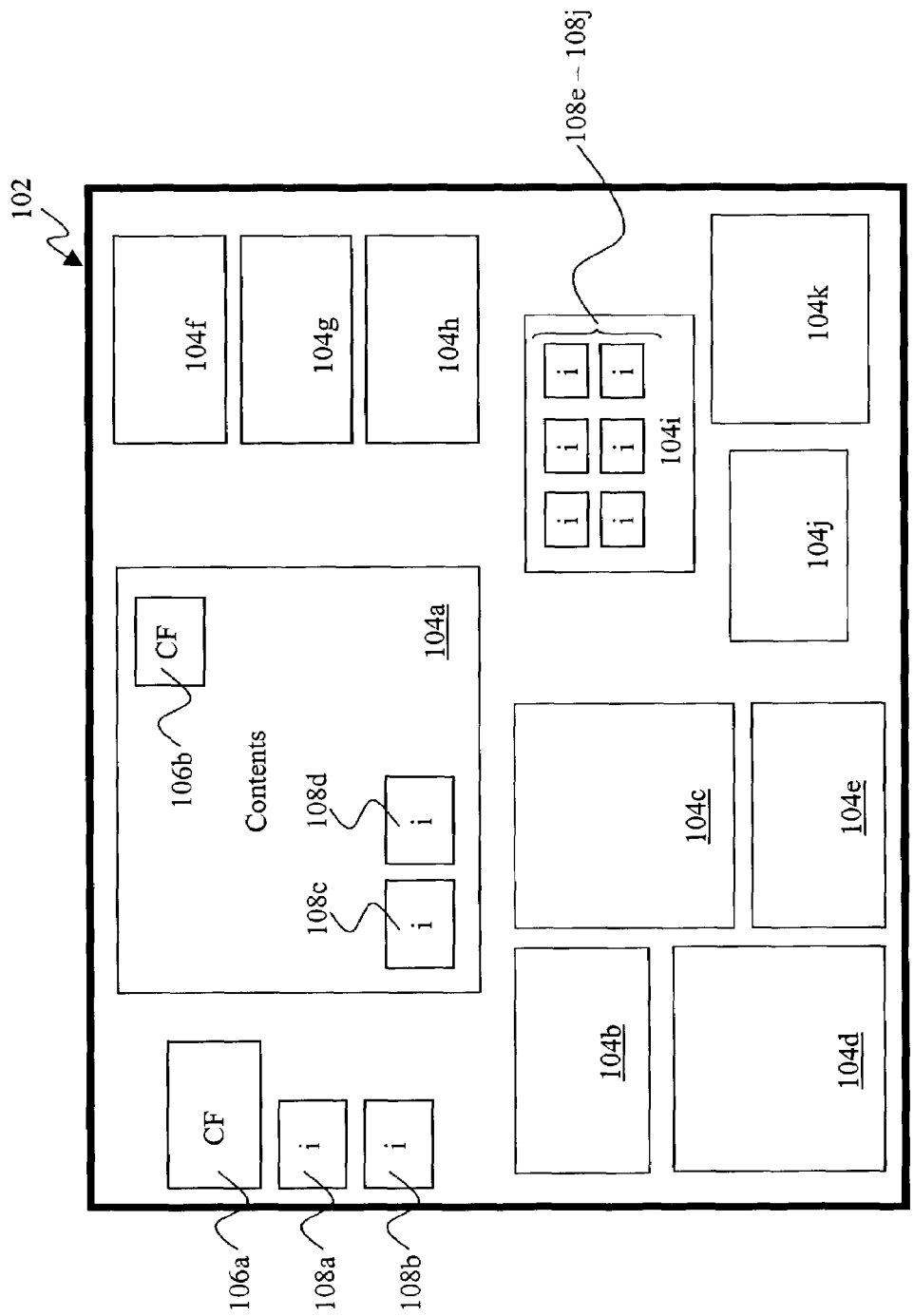
FIG. 1 illustrates an end user view of an EUI implemented in accordance with the present invention; p

FIG. 1 illustrates an external end user view of an exemplary end user interface 102, implemented in accordance with one embodiment of the present invention. As illustrated, exemplary end user interface (EUI) 102, from the end user's perspective, includes multiple display windows 104a–104k, control facilities 106a–106b and icons 108a–108j. EUI 102 may be employed to facilitate delivery of multi-media contents or programming for an end user. An example of such content/programming includes, but are not limited to, presentation of one or more performance or live events, such as sporting events, where the multiple windows are employed to present different views of each performance or event to the end user.

For ease of understanding, only a couple of control facilities 106a–106b and a handful of icons 108a–108j are illustrated with windows 104a–104k. As will be readily apparent to those skilled in the art, based on the descriptions to follow, the present invention may be practiced with more or less of these elements.

More importantly, as will be described in more detail below, EUI 102 is implemented internally via a hierarchy of display cells (or cells for short). The cells are typed and nested. Further, they have attributes, and certain attributes may be inherited in one direction, while others in the other direction, i.e. from a higher level cell or from a lower level cell. The cells are implemented as data objects with associated methods to facilitate manipulation of their data.

Resultantly, one of the benefits is that the views or windows 104a–104k are readily controllable by the end user. An end user may select any one of windows 104a–104k, express a desired modification or change to the size, placement, and/or other related aspects of the windows (such as sound). In response, the implementation logic of the present invention, e.g. a cell manager, or alternatively, a window manager or an application itself (not shown), will resize, re-position or otherwise modify the selected windows, as well as all other impacted elements (cells) of EUI 102 accordingly and automatically.

Resizing may be expansion of a selected element or cell of EUI 102, or contraction of a selected element or cell of EUI 102. Repositioning of a cell may be within the existing immediately higher-level cell or to another cell of EUI 102. In various embodiments, control facilities 106a–106b are provided for the various windows 104* to facilitate a user in resizing, re-positioning or otherwise modifying the various aspects of the windows 104*.

In one embodiment, as the selected and/or impacted windows 104* are re-sized, the content of each window 104* may be automatically scaled, preserving "full" visibility of the contents. That is, the contents of the various windows 104\* remain in full view, scaled, but not truncated or otherwise eclipsed. However, in alternate embodiments, one or more windows 104\* may have their contents truncated or eclipsed instead.

In one embodiment, in addition to being employed for the delivery of multi-media content or programming, one or more of "windows" 104*a*–104*k* may be employed to present a "pool" of icons, each corresponding to an additional displayable or launch-able cell having contents, and/or action that may be performed on the content or the attributes of an associated cell. The former is referred to as an "image icon", and the cell implementing the "image icon" is an image-icon cell, whereas the latter is referred to as a "button icon", and the cell implementing the "button-icon" is a button-icon cell.

These and other aspects of the present invention will be described more fully below. The asterisk at the end of a reference number denotes a "wild card", representing any of the trailing suffixes of the reference numbers employed in a figure. For example, 104\* stands for 104*a*, 104*b* or any one of the other 104 references of FIG. 1.

Anatomy of the End User Interface

Figure 2:
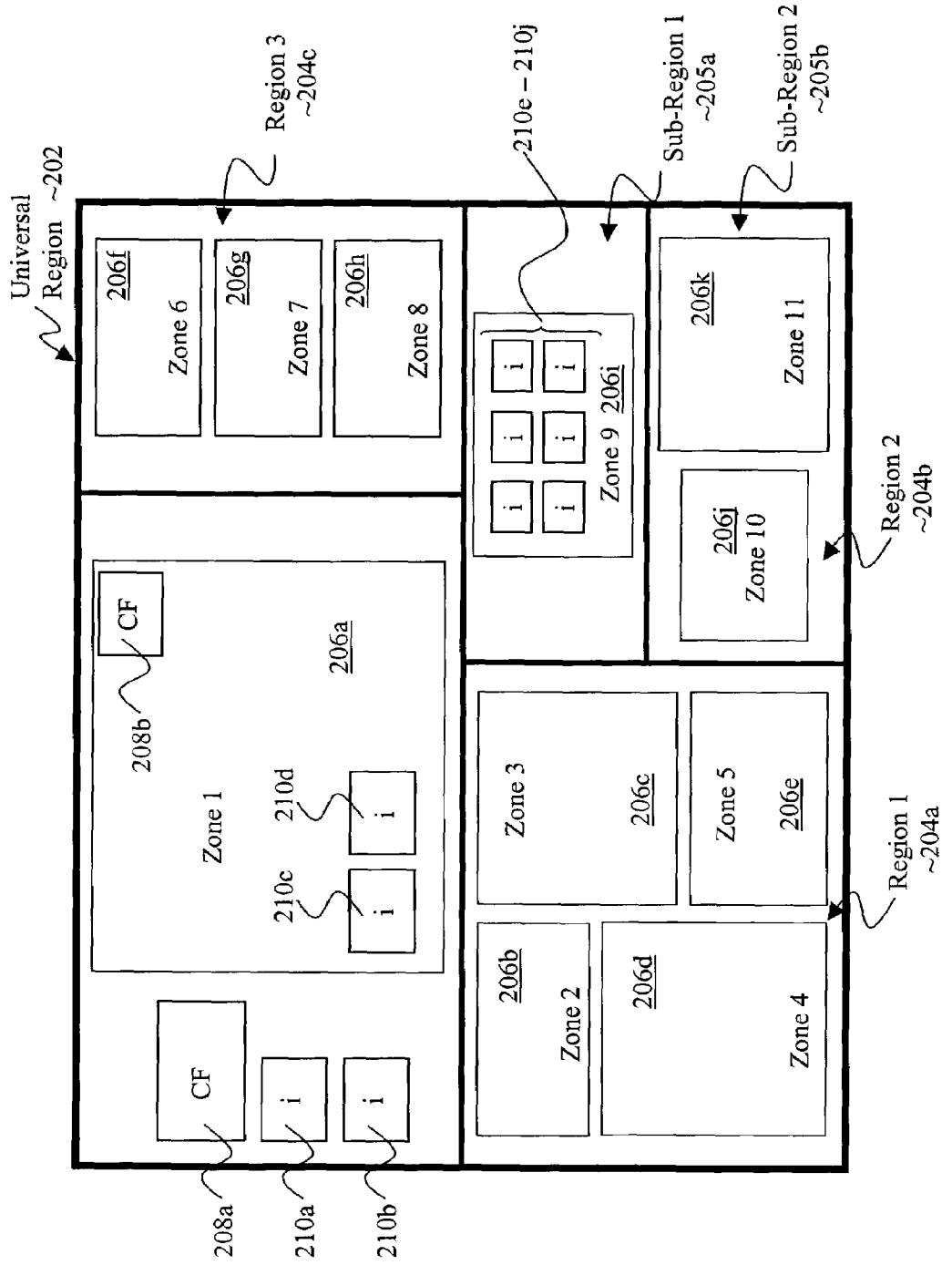
FIGS. 2–3 illustrates the anatomy of a cell based hierarchy for implementing the EUI of FIG. 1, including the universal region cell, region cells, sub-region cells and zone cells, in accordance with one embodiment.
Figure 3:
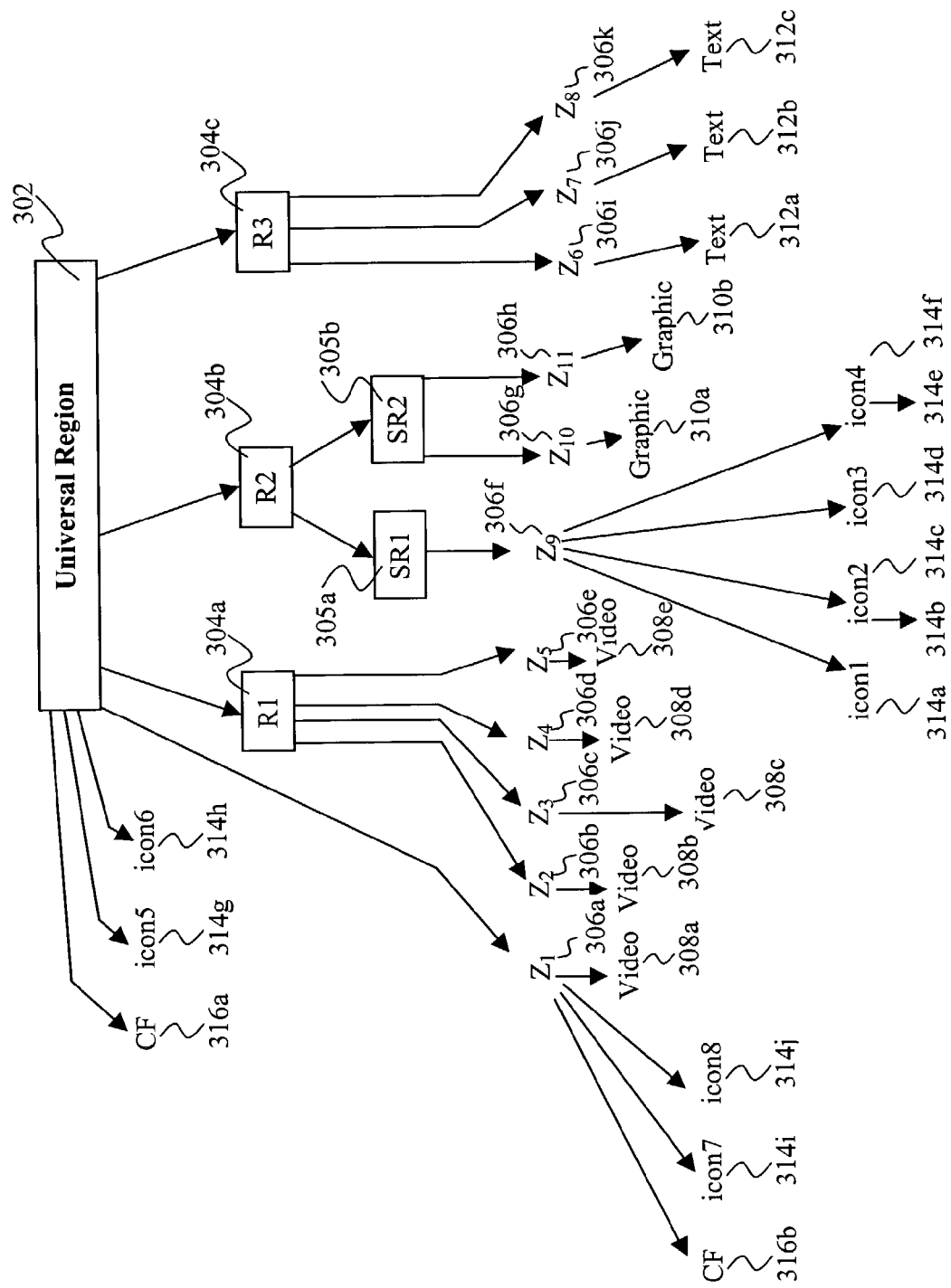

FIGS. 2–3 illustrate the relevant aspects of the internal hierarchical cell based implementation of EUI 102 to provide the desired improved features and behaviors, in accordance with one embodiment. As illustrated, in accordance with the present invention, end user interface 102 is cell based, and the constituting cells are nested (FIG. 2), and the data objects implementing the cells are hierarchically organized (FIG. 3).

As alluded to earlier, cells are typed, and have attributes defining their manifestation and behaviors. Visually, cells may be "nested" within each other. Organizationally, cells may be hierarchically related to each other. The attributes may be inherited in either direction, from the higher level cells or from the lower level cells (organizationally speaking).

More specifically, for the embodiment, each EUI 102 is comprised of a number of nested "container" cells and a number "action" cells. For ease of understanding, the "outer most" (from a nesting perspective) or the highest-level (from a hierarchy perspective) "container" cell, that is the cell corresponding to the totality of display space available, within which all other cells are nested, is referred to as the universal or root region cell 202. Nested within universal region 202 may be one or more nested "container" cells. In particular, at the next highest-level, for the embodiment, for ease of operation, the "container" cells all have visual manifestations that are rectangular in shape, and share borders. These "container" cells are referred to as regions cells 204*a*–204*c*.

Selected one or ones of the region "container" cells may further include one or more nested "container" cells. For ease of understanding, these nested "container" cells, except for ones disposed at the "inner most" nesting or "lowest" level (counting only "container" cells), are referred to as sub-region "container" cells 205*a*–205*b*. The "container" cells disposed at the "inner most" nesting or "lowest" level (counting only "container" cells) are referred to as zone "container" cells 206*a*–206*k*. A zone "container" cell 206\* dedicated to the holding of icon "action" cells (to be described more fully later), such as zone "container" cell 206*i*, is also referred to as an "icon pool".

"Action" cells, such as those implementing control facilities 208*a*–208*b*, and icons 210*a*–210*j*, whether they are representing other displayable or launchable cells or merely representing actions to be performed, i.e. image icons or button icons, may be nested within (visually speaking) or descend from (organizationally speaking)) any of the "container" cells, i.e. the universal region cell 202, such as control facilities cells 208*a*–208*b* and icon cells 210*a*–210*d*, region and sub-region cells 204*a*–204*c* and 205*a*–205*b*, none shown, or zone "container" cells, such as icon cells 210*e*–210*j*.

As described earlier, control facilities may include facilities for facilitating minimizing or maximizing an "action" cell, and an icon "action" cell may be an image or a button icon "action" cell. The "container" cell within which another "container" or "action" cell is nested or from which the other "container" or "action" cell is descended, is also referred to as a "host" cell.

Hereinafter, the description will be given with the relationship between the various cells simply be referred to as either being "nested" in another cell or "descended" from another cell, depending on which characterization is more meaningful in view of the context. However, the reference expressed from one perspective (visual or organizational) is an expression in both perspectives, even expression in the other perspective is not explicitly stated.

Continuing now with the description and referring in particular to FIG. 3, for the embodiment, the data, such as attribute data (described more fully below), associated with each cell, 202 and 204\*–210\*, whether "container" or "action", are organized and implemented as an hierarchy of data objects 302 and 304\*–306\*, with data object 302 corresponding to universal region cell 202 being the root object of the hierarchy, data objects 304\* corresponding to region cells 204\* being descendant data objects of root object 302, data objects 305\* corresponding to sub-region cells 205\* being descendant data objects of the data objects 304\*–305\* of their "host" region/sub-region cells 204\*/205\*, and data objects 306\* corresponding to zones cells 206\* being descendant data objects of the data objects 302 and 304\*–305\* of their host universal/region/sub-region cells 202 and 204–205.

Contents to be presented in various windows 104\*, such as video 308*a*–308*e*, graphics 310*a*–310*b* and texts 312*a*–312*c* are effectuated by associating the data objects of these contents with data objects 306\* of the zone "container" cells 206\* corresponding to windows 104\*. Data objects 314*a*–314*h* and 316*a*–316*b* implementing icons 210*a*–210*j* and control facilities 208*a*–208*b* are descendant data objects of the data objects of their respective host universal/regions/sub-regions/zones 202 and 204\*–206\*.

Resultantly, the novel architecture and data organization enable contents provided through different display windows 104\* to be easily swappable, by swapping the association of the contents' data objects with the "host" zone cell 206\*. Similarly, the associations of "action" cells 208\* and 210\* with the different cells 202 and 204\*–206\* may also be easily changed, by changing the association between data objects 314\*–316\* with data objects 302 and 304\*–306\* of cells 202 and 204\*–206\*.

For ease of understanding, only one zone "container" cell 206*a* and limited number of "action" cells 208*a* and 210*a*–210*b* are illustrated as being directly nested in universal region 202, only one region "container" cell 304*b* as having sub-region-"container" cells 254\*, and only one zone "container" cell 206*i* is deployed as an icon pool in FIGS. 2–3. However, the present invention contemplates multiple nesting of multiple "container" and "action" cells, e.g. more region/zone "container" cells as well as "action" cells may be nested in universal region 202, more third level sub-region "container" cells and/or "action" cells may be nested within region "container" cells of the second level. From the description thus far and the ones to follow, those skilled in the art will be able to practice the present invention in such multi-level manner, should that be desired.

Anatomy of "Container" Cells

FIGS. 4–5 illustrate the composition of "container" cells, in particular, a region "container" cell and a zone "container" cell, in accordance with one embodiment. From the processing or computation perspective, the earlier described universal region cell 202, region "container" cell 204*, and sub-region "container" cells 205* are merely different variants the region "container" cell to be described. Accordingly, the composition descriptions to follow apply equally to universal region-cell 202, region "container" cell 204*, and sub-region "container" cells 205*.

As illustrated, for the embodiment, associated with the definition of each region/zone "container" cell 202 and 204*–206*, and stored inside corresponding data objects 302 and 304*–306* are attributes defining whether a "container" cell 204*–206* is dynamic or fixed (i.e. created on an as needed basis, or always present), whether the "container" cell's position is movable or stationery, its relative priority to other "container" cells 204*–206*, a center position, a base, a height and a maximum size of the region/zone "container" cells 204*–206*:

| region "container" cell | zone "container" cell |
|---|---|
| region_type = [dynamic, fixed] | zone_type = [dynamic, fixed] |
| region_position = [stationary, movable] | zone_position = [stationary, movable] |
| region_priority = [1, 2, 3 . . . ] | zone_priority = [1, 2, 3 . . . ] |
| region_center_position | zone_center_position |
| region_base | zone_base |
| region_height | zone_height |
| region_maximum_size | zone_maximum_size |

Additionally, for the embodiment, associated with the definition of each region/zone "container" cell 202 and 204*–206*, and stored inside corresponding data objects 302 and 304*–306* are attributes defining a kernel 402/502 of the region/zone "container" cell 204*–206*. A kernel of a region/zone "container" cell 204*–206* refers to the smallest manifestation of the region/zone "container" cell 204*–206*. That is, when the available space within a host "container" cell 202–205* falls below the space required by the kernel of a region/zone "container" cell 204*–206*, the "container" cell 204*–206* is to be "reduced" to an icon cell. For the embodiment, the kernel related attributes include attributes defining a region/zone "container" cell's kernel's size, base and height.

| region-cell | zone-cell |
|---|---|
| region_kernel_area | zone_kernel_area |
| region_kernel_base | zone_kernel_base |
| region_kernel_height | zone_kernel_height |

Further, for the embodiment, associated with the definition of each region/zone "container" cell 202 and 204*–206*, and stored inside corresponding data objects 302 and 304*–306* are attributes defining a boundary 406/506 of the region/zone "container" cell 204*–206*. The boundary related attributes include attributes defining a thickness and a color of the boundary of the region/zone "container" cell 204*–206*.

| region-cell | zone-cell |
|---|---|
| region_boundary_thickness | zone_boundary_thickness |
| region_boundary_color | zone_boundary_color |

In one embodiment, if the "boundary" attributes are not specified for a region/zone "container" cell, the region/zone "container" cell automatically inherits the "boundary" attributes of the nearest "ancestor" region "container" cells, where such attributes are specified. In other words, an inheriting region/zone "container" cell takes on the characteristics of the bequeathing "ancestor" region "container" cell.

Associated with the definition of each region/zone "container" cell 202 and 204*–206*, and stored inside corresponding data objects 302 and 304*–306* are also attributes defining a border 404/504 of the region/zone "container" cell 204*–206*. The border related attributes include attributes defining a thickness, a color, a texture, a shading, a blinking and a transparency attribute of the border of the region/zone "container" cell 204*–206*.

| region-cell | zone-cell |
|---|---|
| region_border_thickness | zone_border_thickness |
| region_border_color | zone_border_color |
| region_border_texture | zone_border_texture |
| region_border_shading | zone_border_shading |
| region_border_blinking | zone_border_blinking |
| region_border_transparent | zone_border_transparent |

In one embodiment, if the "border" attributes are not specified for a region/zone "container" cell, the region/zone "container" cell also automatically inherits the "border" attributes of the nearest "ancestor" region "container" cell, where such attributes are specified.

In various embodiments, for a region "container" cell 204*–205*, the attributes may further include attributes defining how many zone "container" cells it may have, their names and their default alignments (e.g. center, top, bottom, right, left and so forth), whereas for a zone "container" cell 206*, the attributes may further include an attribute defining its "host" region "container" cell 202 and 204*/205*. For a zone "container" cell 206*, the attributes may further include attributes defining its content types, video, data, image, text, and so forth, and an external buffer 508. External buffer 508 defines the minimum inter-zone "container" cell spacing between immediately adjacent zone "container" cells 206*.

| region-cell | zone-cell |
|---|---|
| region_zone_list = [zone-cell ames] | zone_region_association |
| region_zone_alignment = [center, top, bottom, right, left] | zone_video, zone_data, zone_image, zone_text |
| region_max_allowable_zones = [number] | |

The above described attributes for region/zone "container" cells are merely illustrative. In alternate embodiments, the present invention may be practiced with more or less region/zone "container" cell attributes. For example, the present invention may be practiced with additional attributes defining a) the control facilities associated with the region/zone "container" attributes, b) the behavior when certain areas of a region/zone "container" cell is "mouse over", and c) forced bequeathing of certain attributes to the more inner or lower level region/zone "container" cells.

Anatomy of an "Action" Cell

Figure 6:
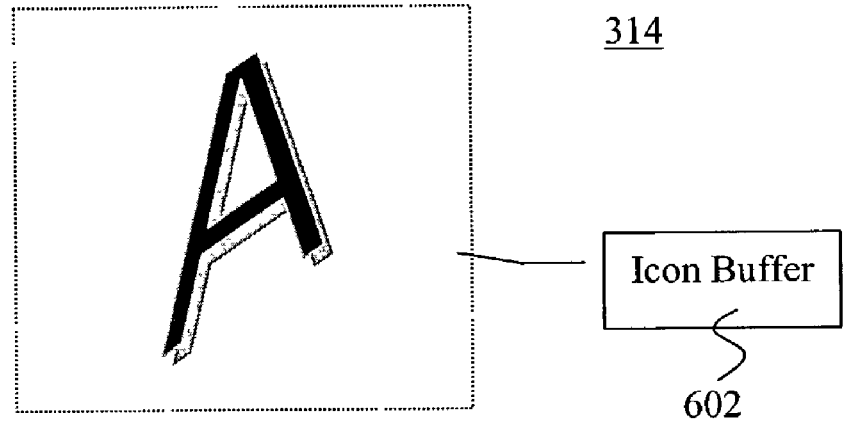
FIG. 6 illustrates selected aspects of the composition of an "action" cell, in particular, an icon cell, in accordance with one embodiment.

FIG. 6 illustrates the composition of an "action" cell, more specifically, an image icon "action" cell in further detail, in accordance with one embodiment. As described earlier, an image icon "action" cell is an iconic representation of another displayable or launch-able cell with content, control facilities and so forth. Further, "action" cells may also include cells defining control facilities, and cells defining "button" icon, which provide control facilities for a region/zone "container" cell and action to be performed within a region/zone "container" cell respectively. The description to follow for an image icon "action" cell may be likewise adopted to implement button icon "action" cells and/or control facilities cells.

As illustrated, for the embodiment, associated with the definition of each image icon "action" cell 208*–210* and stored inside a corresponding data object 314*–316* are attributes defining the bit map of the image icon "action" cell, the center position of the image icon "action" cell, a region/zone "container" cell with which the image icon "action" cell is associated, and a buffer 602. Buffer 602 defines the minimum space required to display the image icon "action" cell.

```
Icon-cell
  image_icon_association = [region/zone-cell name]
  image_icon_center_position = [x, y]
  image_icon_actual = [bit_map_name]
  image_icon_buffer_base = [ ]
  image_icon_buffer_height = [ ]
  image_icon_upper_left_vertex_position = [x, y]
```

Similarly, in alternate embodiments, the present invention may be practiced with more or less attributes defining the various "action" cells, as well as the contents to be rendered (i.e. video, graphics, texts, and so forth). In particular, for button icon "action" cells and control facility "action" cells, each of the respective "action" cells may include one or more attributes in identifying the binaries to be executed responsive to various types of user actions, e.g. "mouse over", "single click", "double clicks", and so forth.

Implementation Methods of "Container" and "Action" Cells

Referring briefly to FIG. 3 again, as described earlier, for the illustrated embodiment, region/zone "container" cells, "action" cells, and data (include video, graphics, text and so forth) are implemented in an object oriented manner, with corresponding data objects 302 and 304*–316*. In one embodiment, as illustrated in FIG. 7, various methods 700 are associated with the data objects 302 and 304*–316*. For the embodiment, these methods include in particular a clear, a contract, an expand, a remove, and a set attribute method, 702–710, associated with the root data object 302, and inherited by the descendant data objects 304*–316* of the nested region/zone "container" cells 204*–206*, as well as the descendant data objects 314*–318* of the nested "action" cells 208*–210*.

Clear method 702, when invoked against universal region "container" cell's data object 302 clears the EUI 102, i.e. removing all nested region/zone "container" cells 204*–206*, including their contents, as well as any nested "action" cells 208*–210*. In one embodiment, the universal region "container" cell clearing is efficiently achieved by clearing or deleting all descendant data objects 304*–316*. Inner invocation against a region/zone "container" cell 204*–206* clears the nested regions/zones "container" cells 204*/206* within the target region/zone "container" cell 204* including their contents, and any nested "action" cells 208*–210*. In like manner, the clearing is efficiently achieved by clearing or deleting the applicable descendant data objects 304*–316*.

Expand and contract methods 704–706 are employed to expand and contract a region/zone "container" cell 204*–206* respectively. Remove method 708 facilitates removal of individual cells of the EUI 102, i.e. one or more regions/zone "container" cells 204*–206* or "action" cells 208*–210* without clearing all cells. Removal is achieved in like manner as clear method 702, except the operation is applied to selected ones of the descendant data objects, as opposed to all descendant data objects. Set Attribute method 710 facilitates setting of the earlier described region/zone "container" cell and "action" cell attributes associated with region/zone "container" cells 202 and 204*–206*, and "action" cells respectively.

For region/zone cells 204*–206* and "action" cells 208*–210*, their corresponding data objects 304*–306* and 314*–316* further include the association of a create, and a delete, a move and a place method 712–718. Create and delete methods 712–714, as their names suggest, facilitate creation and delete of the various descendant data objects 304*–306* and 314*–316* for the nested region/zone "container" cells and "action" cells 204*–206* and 208*–210*. Move and place methods 716–718, as their names suggest, facilitate movement and relocation of the various region/zone "container" cells and "action" cells 204*–206* by modifying e.g. the position attributes of the corresponding data objects 304*–306* and 314*–316*.

For the embodiment, data objects 314*–316* for "action" cells 208*–210* further include the association of a launch method 720 for launching a displayable region/zone cell 204*–206* represented by image icon "action" cells 210*.

With the exception of the handling of the impact that flows from the creation, deletion, expansion and contraction of a region/zone "container" cell 204*–206*, implementation of the above described methods are within the ability of those ordinarily skilled in the art, accordingly will not be further described. Handling of the impact that flows from the creation, deletion, expansion and contraction of a region/zone "container" cell 204*–206* will be described in more detail below, referencing FIGS. 11–16.

Interacting with EUI

Figure 8:
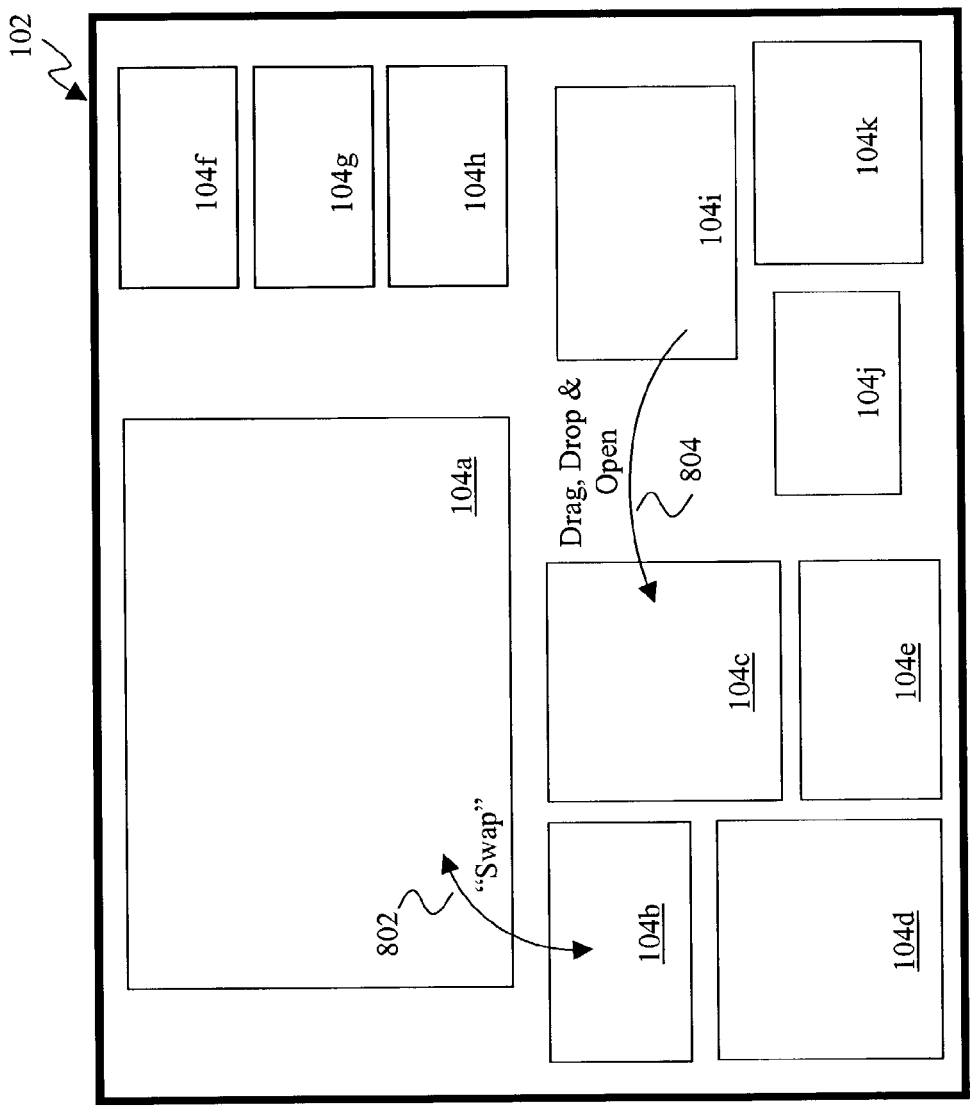
FIG. 8 illustrates certain novel end user interface interactions supported under the present invention, by virtue of the architectural design of the hierarchical cell based EUI, in accordance with one embodiment.
Figure 9:
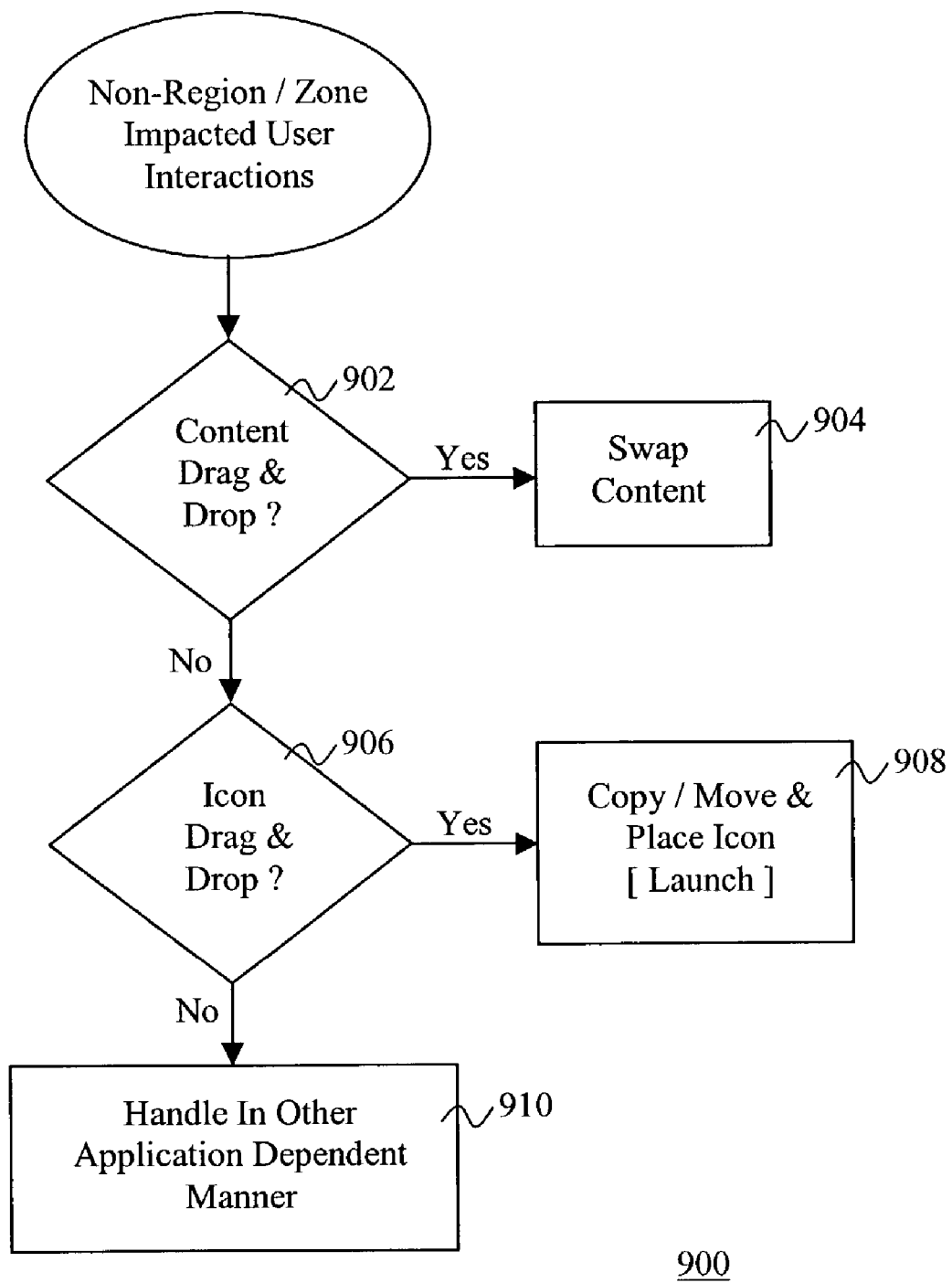
FIG. 9 illustrates the operational flow of the relevant aspects of an implementor of the present invention, such as an application, a cell manager or a window manager, in support of the novel end user interactions of FIG. 8, in accordance with one embodiment.

FIGS. 8–9 illustrate two novel interactions with EUI 102, otherwise not available under the prior art, and the relevant operation flow of an implementor, such as an application, a cell manager or a window manager, incorporated with the teachings of the present invention. As illustrated, by virtue of the earlier described novel architecture and data organization, contents presented through two different zone "container" cells 206* may be easily interchanged or swapped, as denoted by arrow 802. The swapping operation may be initiated through any one of a number of user key sequences, e.g. user key sequences similar to a conventional drag and drop operation. The swapping may be efficiently accomplished by switching association of the applicable data objects 308*–316* and their region/zone "container" cells 204*–206*. Further, "action" cells 314*–316* may be easily relocated to any region/zone "container" cell 204*–206* as denoted by arrow 804.

As illustrated in FIG. 9, in response to a non-region/zone "container" cell impacted user interaction, an implementor (such as an application, a cell manager or a window manager incorporated with the teachings of the present invention) determines if the sequence of user inputs denotes a drag and drop of content from one region/zone "container" cell 204*–206* to another, block 902. If so, the implementor effectuates the content swapping, by switching the data objects' association with their region/zone "container" cells 204*–206*, as earlier described, block 904.

If the sequence of user inputs does not denote a drag and drop of content, for the embodiment, the implementor further determines if the sequence of user inputs denotes an "action" cell drag and drop, block 906. If so, the implementor effectuates the "action" cell movement and placement by similarly switching the "action" cell's association with region/zone "container" cells 204*–206*, optionally launching the represented region/zone "container" cell 204*–206* and its contents (if so requested by the sequence of user inputs), block 908.

If the sequence of user inputs does not denote either one of these novel interactions supported, the denoted prior art request may then be processed as in the prior art.

The sequence of user inputs denoting the earlier described content and "action" cell drag and drop may be practiced through any key sequences, e.g. by clicking on the content or icon, using a cursor control device, and keeping the applicable click button of the cursor control device held down, until the target region/zone "container" cell 206* is reached. At such time, the click button of the cursor control device may be returned to its normal position. In alternate embodiments, the present invention may be practiced with other key sequences instead.

Transition from a Current View to a Next View

Figure 10:
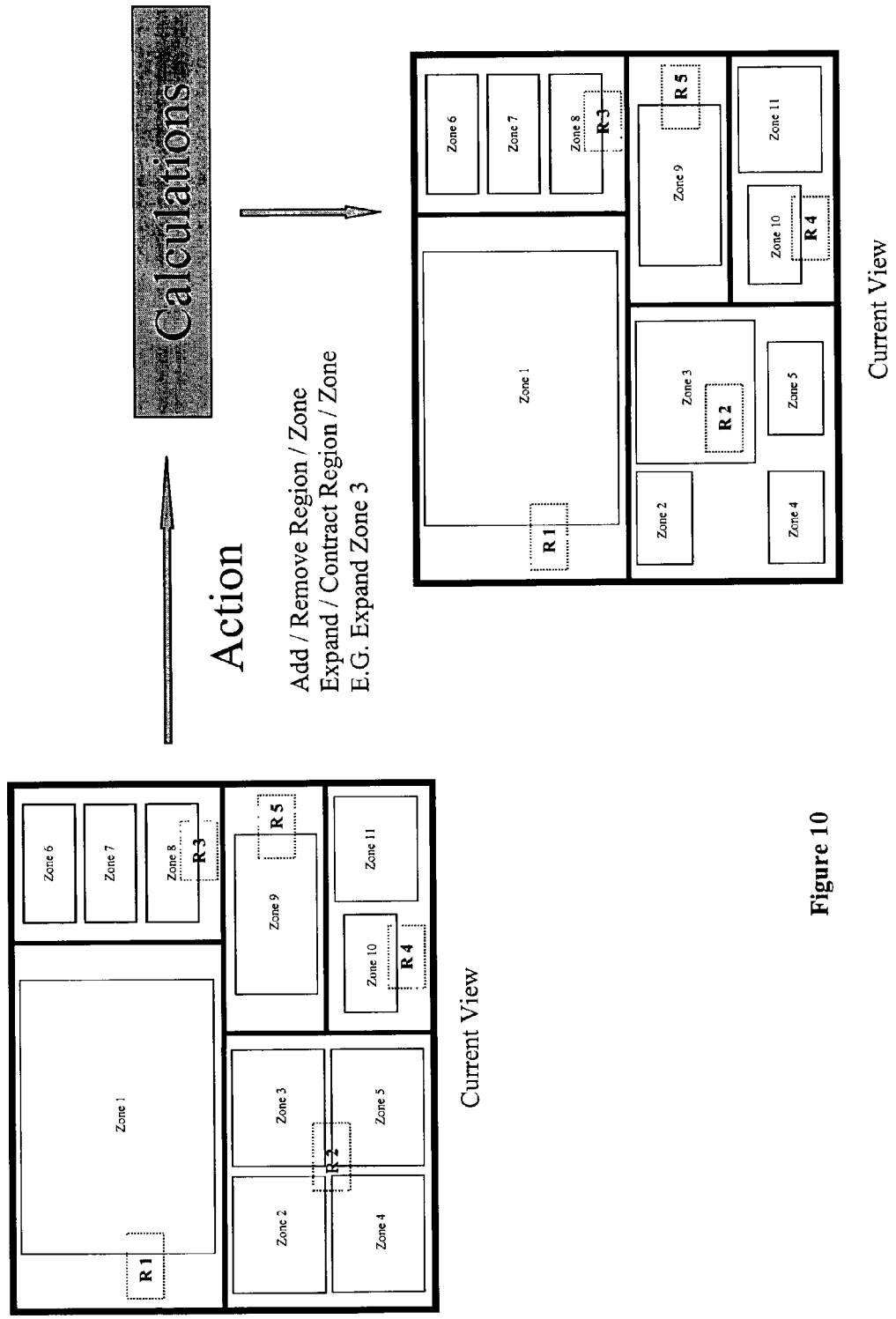
FIG. 10 illustrates the notion of a current view, and the generation of a next view under the present invention, in accordance with one embodiment.

FIG. 10 illustrates an overview of the operation of EUI 102. The current state of EUI 102 as defined by the current states of the corresponding data objects 302–316* of the constituting cells 202–210* of EUI 102, as illustrated, is referred to as the current view of EUI 102. In response to user interactions, such as a request to add or remove a region/zone "container" cell 204*–206*, or a request to expand or contract a region/zone "container" cell 204*–206*, the implementor of the present invention, e.g. an application, a cell manager or a window manager, performs a series of responsive calculations, and generate the next view of EUI 102.

The operational flow of the relevant aspects of the implementor, in response to the various user interactions of interest, will be described in turn below.

Addition/Expansion of a Region/Zone "Container" Cell

Figure 11:
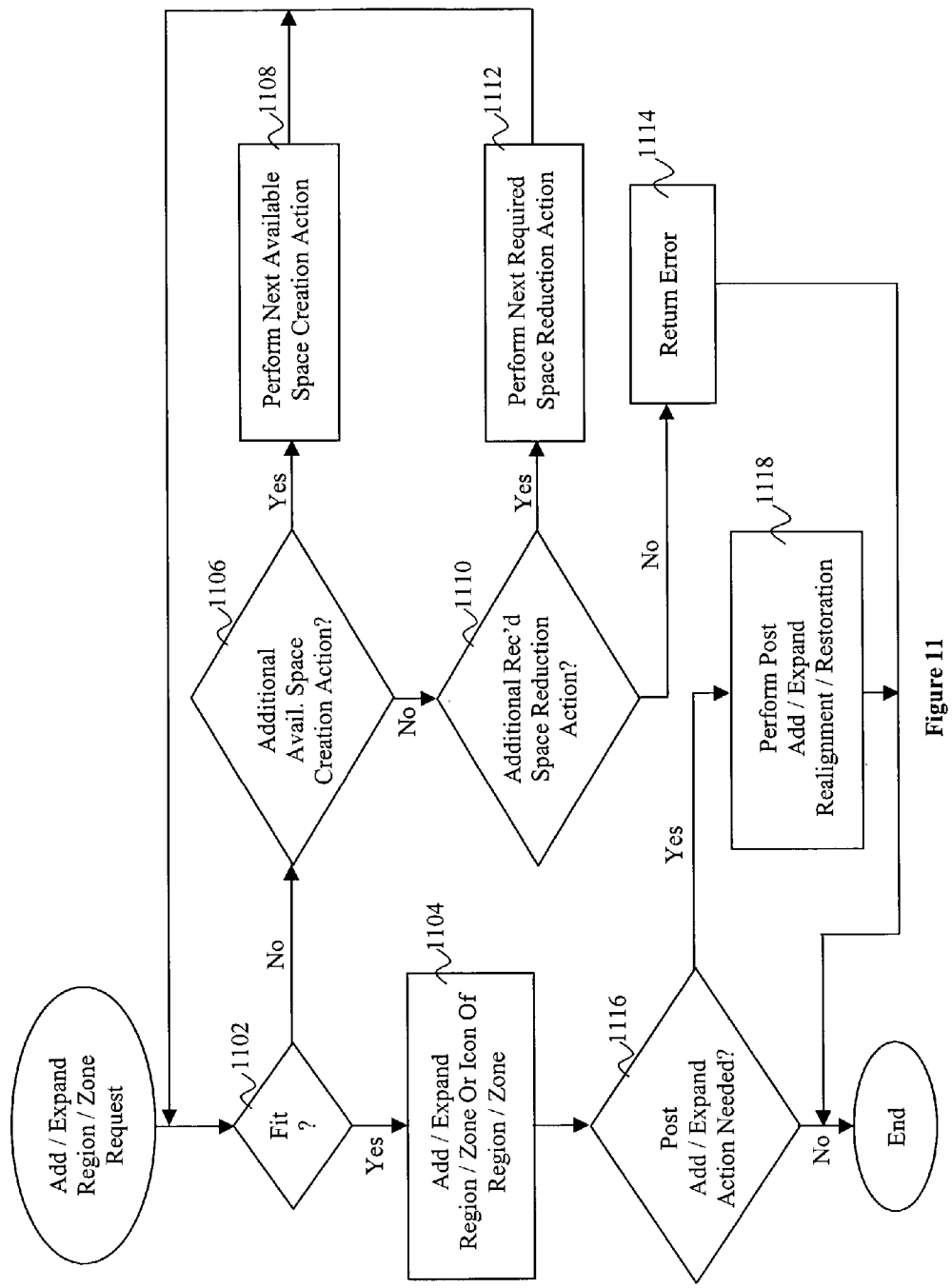
FIGS. 11–12 illustrate the operational flow of the relevant aspects of an implementor of the present invention, such as an application, a cell manager or a window manager, in support of automatic relative re-sizing or re-placement of region cells or zone cells, in accordance with one embodiment.

FIG. 11 illustrates the operational flow of the relevant aspects of an implementor, e.g. an application, a cell manager or a window manager, for responding to a request to add a region/zone "container" cell or an "action" cell to a region/zone "container" cell, or expand a region/zone "container" cell (hereinafter, for the description of FIG. 11, simply the "add/expand" request), in accordance with one embodiment. As illustrated, for the embodiment, the implementor first determines if the requested addition or expansion fits in the current available space of the host region/zone "container" cell, block 1102. The required space to accommodate the requested addition/expansion may e.g. be determined from the attribute values of the "new" or expanded region/zone "container" cell. If the requested addition or expansion fits in the current available space of the host region "container" cell, the requested addition or expansion is performed accordingly, block 1104.

However, if the requested addition or expansion does not fit in the current available space of the host region/zone "container" cell, the implementor successively undertakes one or more space creation actions, until either sufficient amount of available space has been created or until all possible space creation actions have been exhausted, blocks 1102–1108. As soon as sufficient available space has been created, operation continues at block 1104 as earlier described.

However, if all possible space creation actions have been exhausted and the amount of space required to accommodate the requested addition or expansion remains insufficient, the implementor successively undertakes one or more space requirement reduction actions, until either the required space has been reduced below the amount of available space or until all possible space reduction actions have been exhausted, blocks 1110–1112. Similarly, as soon as the required space to satisfy the addition or expansion request is reduced below the available space, operation continues at block 1104 as earlier described.

If likewise, all possible required space reduction actions are exhausted, and the amount of space required to accommodate the add/expand request remains above the available space, an "error", such as "unable to add/expand", is returned in response to the request.

In one embodiment, available space creation actions include shifting existing region/zone "container" cells within the host region/zone "container" cell the add/expand request is to be performed, and reducing the existing region/zone "container" cells if necessary. In one embodiment, shifting of existing region/zone "container" cells includes shifting the existing regions/zone "container" cells to a predetermined corner of the host region/zone "container" cell, e.g. the lower left corner, the upper left corner, the upper right corner or the lower right corner. In one embodiment, shifting of existing region/zone "container" cell to a corner is performed by aligning the region/zone "container" cells along one or the other boundary forming the corner. In another embodiment, shifting of existing region/zone "container" cells to a corner is performed by alternating in aligning the regions/zone "container" cells along the boundaries forming the corner.

In one embodiment, reducing the existing region/zone "container" cells is performed in an incremental manner. In another embodiment, reducing the existing region/zone "container" cells is performed in accordance with the relative priorities of the existing region/zone "container" cells.

In one embodiment, reduction is performed in an incremental manner as well as in view of the relative priorities of the existing region/zone "container" cells. In one embodiment, the lowest priority region/zone "container" cell is first successively reduced to its kernel before the next higher priority region/zone "container" cell is successively reduced towards its kernel. In another embodiment, the reduction is successively performed in a round robin manner. In yet another embodiment, reduction of existing region or zone "container" cells further includes reducing one or more of the existing region/zone "container" cells to their icon "action" cell representations. Again, in one embodiment, the reduction to iconic representation is performed in view of the relative priorities of the existing region/zone "container" cells.

In one embodiment, reduction of required space action includes successively reducing the size of the region/zone "container" cell to be added, or to be expanded to.

Still referring to FIG. 11, back at block 1104, upon performing the requested addition/expansion, the implementor determines if any post addition/expansion operations need to be performed. If so, the post addition/expansion operations are performed, block 1118. If not, the process terminates.

Post addition/expansion operations may be required, as existing region/zone "container" cells may have been shifted to one corner of the host region/zone "container" cell or reduced, even to their kernel, in the course of accommodating the addition/expansion request. Accordingly, for the embodiment, upon accommodating the addition/expansion, attempts are made to at least partially restore the shifted and/or reduced region/zone "container" cells back to the pre-request state. Similarly, the post addition/expansion operations may include successively expanding reduced existing region/zone "container" cells, which may also be performed in view of the relative priorities, re-shifting shifted region/zone "container" cells (e.g. out from the coalesce corner) to achieve a more balance alignment of the nested region/zone "container" cells within the host region "container" cell. "Balance" may be measured e.g. by the average space gap between the boundaries of the various region/zone "container" cells.

Figure 13:
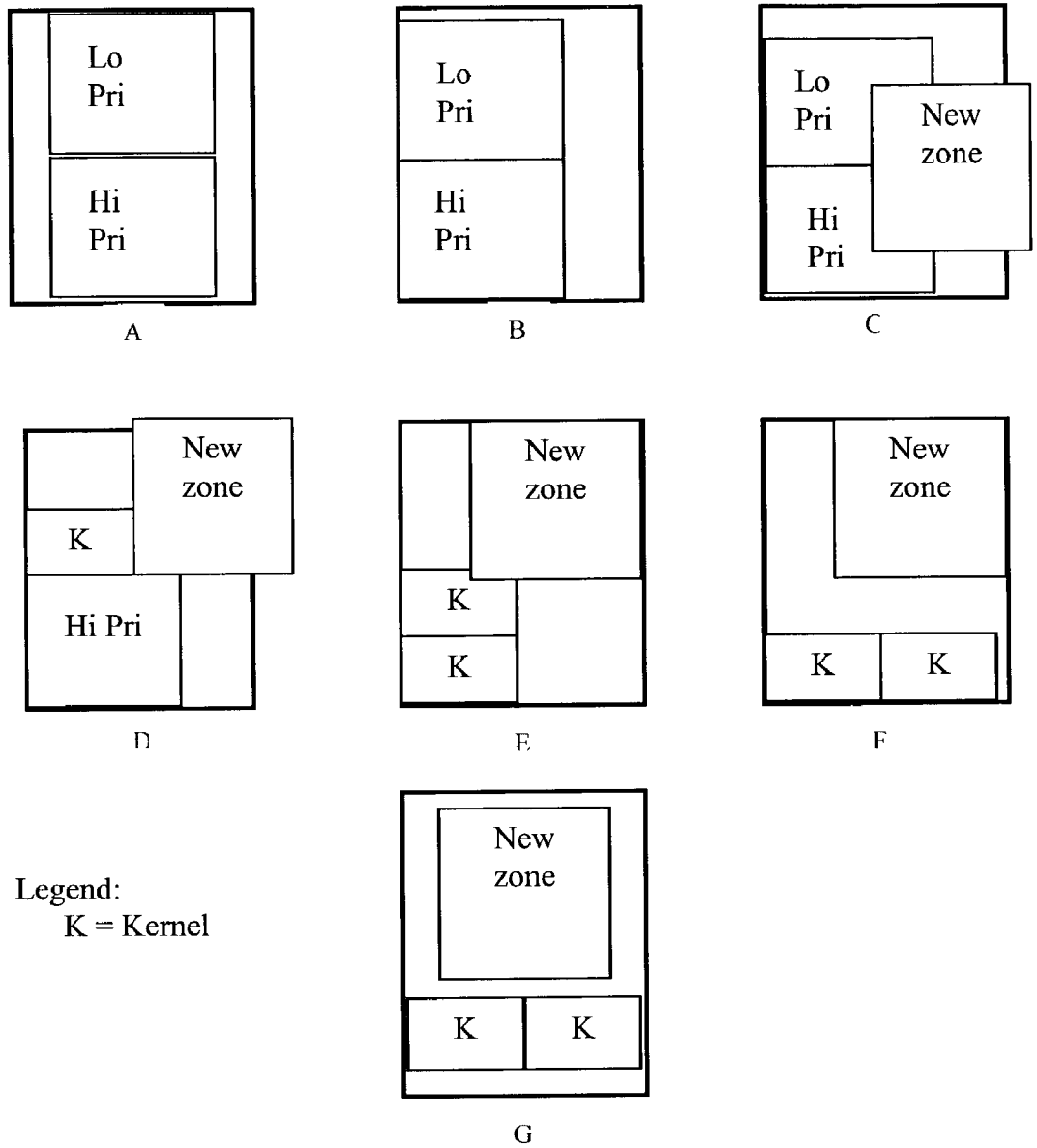

FIG. 13 illustrates an exemplary addition of a new region/zone "container" cell into a region "container" cell having two existing region/zone "container" cells, in accordance with the above described process. As illustrated, the two existing region/zone "container" cells are first shifted to the lower left corner, with the two existing region/zone "container" cells aligned along the left boundary forming the lower left corner (illustrations A & B). Since there isn't enough available space to add the requested new region/zone "container" cell, the two existing region/zone "container" cells are successively reduced, eventually to their kernels, first the lower priority region/zone "container" cell, then the higher priority region/zone "container" cell (illustrations C–D). The new region/zone "container" cell is then added to the newly created space in the opposite upper right corner (Illustration E). Further, the reduced region/zone "container" cells are shifted back out from the lower right corner and aligned in the bottom portion of the host region/zone "container" cell (illustration F & G).

FIG. 14 illustrates another exemplary addition of a new region/zone "container" cell into a region/zone "container" cell having three existing region/zone "container" cells, in accordance with the above described process. Except in this illustration, the existing region/zone "container" cells are first shifted to the upper left corner, and then shifted out along the top portion of the host region/zone "container" cell instead. Further, the new region/zone "container" cell is reduced to reduce its space requirement before it is added to the host region/zone "container" cell.

Removal/Contraction of a Region/Zone "Container" Cell

Figure 12:
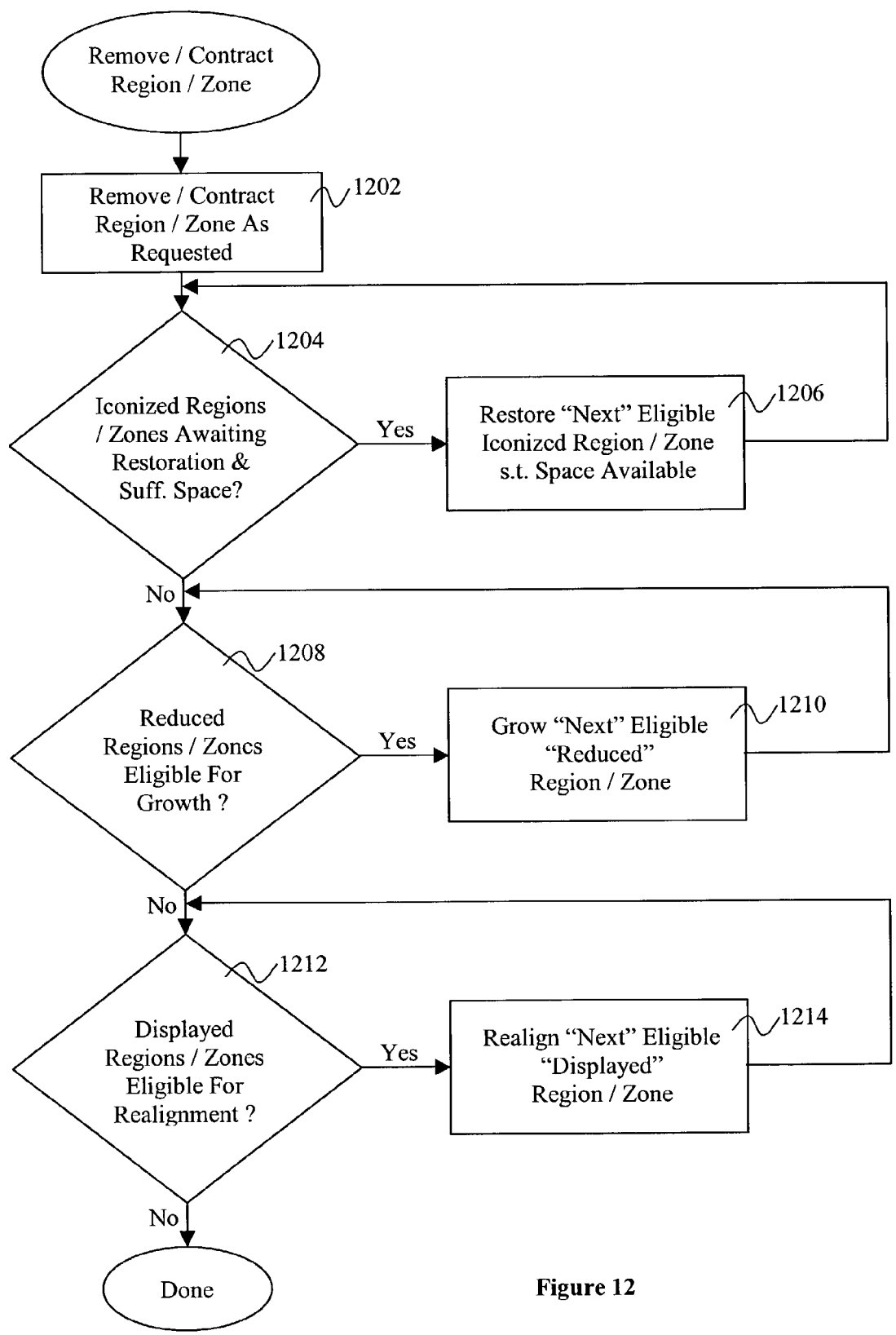

FIG. 12 illustrates the operational flow of the relevant aspects of an implementor, e.g. an application, a cell-cell manager or a window manager, for responding to a request to remove a region/zone "container" cell from a region "container" cell, or an "action" cell from a region/zone "container" cell (hereinafter, for the description of FIG. 12, simply the "remove/contract" request), in accordance with one embodiment. As illustrated, for the embodiment, the implementor removes or contracts the region/zone "container" cell, or the "action" cell as requested, block 1202. Thereafter, the implementor determines if the there are iconized region/zone "container" cells of the host region/zone "container" cell that can be restored into the newly increased available space of the host region/zone "container" cell, block 1204. If so, the implementor restores one or more of the eligible iconized region/zone "container" cells, subject to the available space, block 1206. In one embodiment, the restoration is performed in accordance with the relative priorities of the iconized region/zone "container" cells.

Upon exhausting the possibility of restoring iconized region/zone "container" cells (either because there are none left or there isn't enough space), the implementor determines if there are any reduced region/zone "container" cells that can be grown towards their maximum sizes, block 1208. If so, the implementor successively grows one or more of the reduced region/zone "container" cells, subject to the available space, block 1210. In one embodiment, the successive growth is also performed in accordance with the relative priorities of the reduced region/zone "container" cells.

Figure 15:
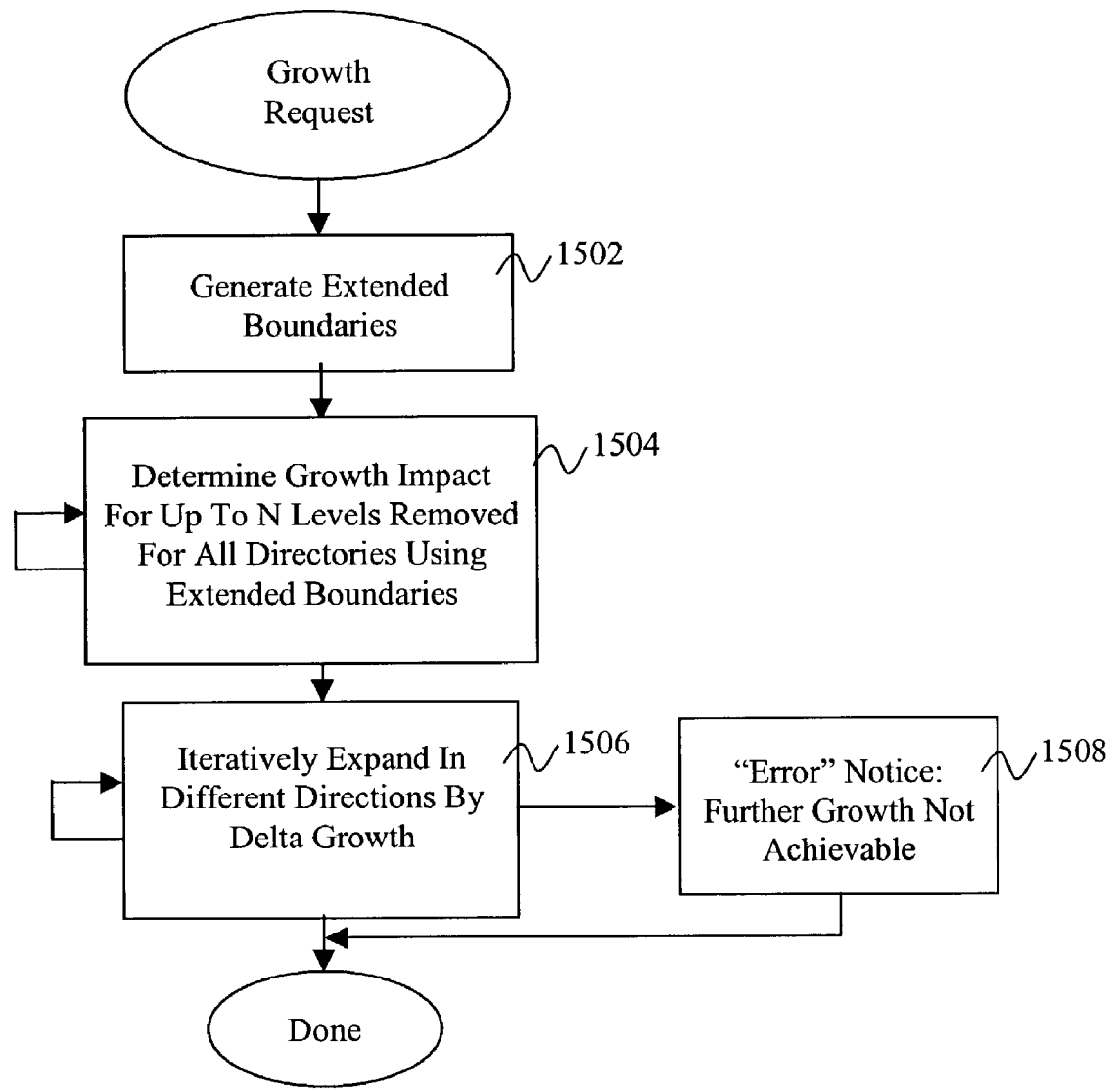
FIG. 15 illustrates the operational flow of the relevant aspects of an implementor of the present invention, such as an application, a cell manager or a window manager, in support of an optimized algorithm for efficiently modifying contiguous region or zone cells, in accordance with one embodiment.

Next, similar to the process of adding or expanding a region/zone "container" cell, upon restoring or growing the iconized or reduced region/zone "container" cells, the implementor determines if any post restoration or growth actions need to be performed, block 1212. If so, the implementor performs the post restoration or growth actions, such as shifting and aligning to "re-balance" the region/zone "container" cells of the host region/zone "container" cell, block 1214. As before, "balance" may be measured e.g. by the average space gap between the boundaries of the various region/zone "container" cells Alternate Embodiment—Extended Boundary Method FIG. 15 illustrates the operational flow of the relevant aspects of an implementor, e.g. an application, a cell manager or a window manager for responding to a request to expand a region "container" cell (hereinafter, for the description of FIG. 15, simply the "add/expand" request), in accordance with another embodiment. In this embodiment, for efficiency of operation, region "container" cells are nested within a host region "container" cell in a contiguous manner, i.e. without available space gap between their boundaries.

As illustrated, in response to a request to grow a region "container" cell by an amount, the implementor first generates extended boundaries for the growth region "container" cell (see FIG. 16), block 1502. Next, the implementor determines growth impact for up to n levels removed in all directions, using the extended boundaries.

Figure 16:
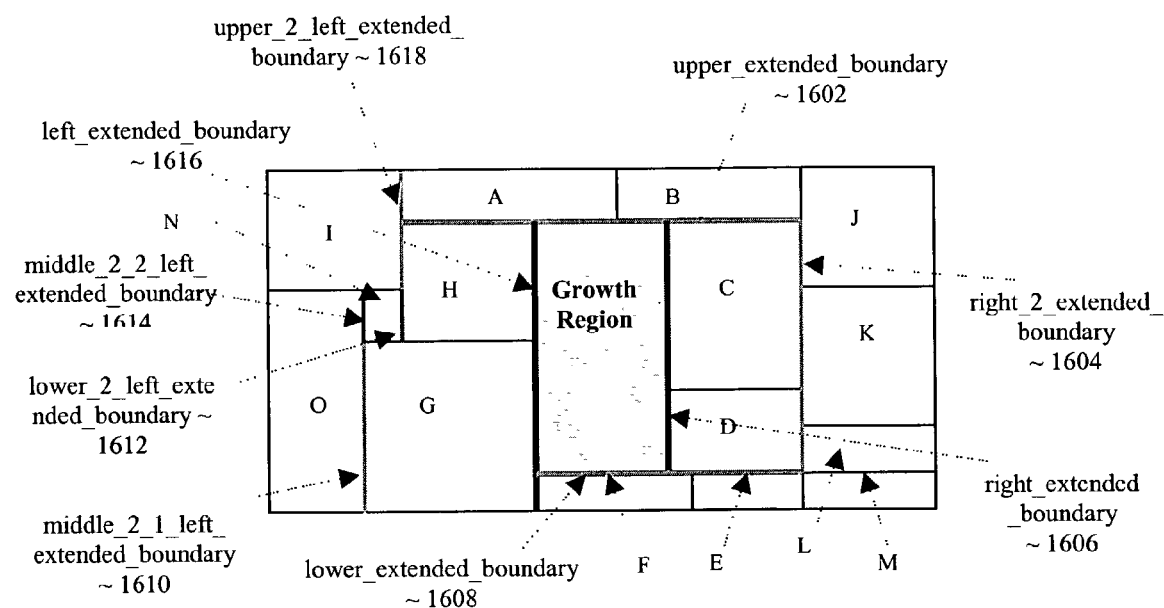
FIG. 16 further illustrates the optimized efficient modification of region or zone cells of FIG. 15, in accordance with one embodiment.

For example, for the exemplary growth request illustrated in FIG. 16, growth impact of the center region "container" cell may be determined using its extended boundaries, based on their intersections with other boundaries. The impacts on region "container" cells up to 2 degrees removed from the center region "container" cell may be summarized as follows:

|  | up | down | left | right |
|---|---|---|---|---|
| Neighbor region "container" cell affected | A, B | F, E | H, G | C, D |
| Second level region "container" cell affected | none | none | special case | L, K, J |
| Side Effects | H, C | D | F | none |

Thereafter, for the embodiment, the implementor iteratively expands the region "container" cell in the various directions, adjusting the impacted region "container" cell to accommodate the growth, block 1506. The process continues until the desired amount of growth is achieved. If the desired growth is not achievable, for the embodiment, an "error", such as "growth unachievable", is returned, block 1508.

Implementor

Figure 17A:
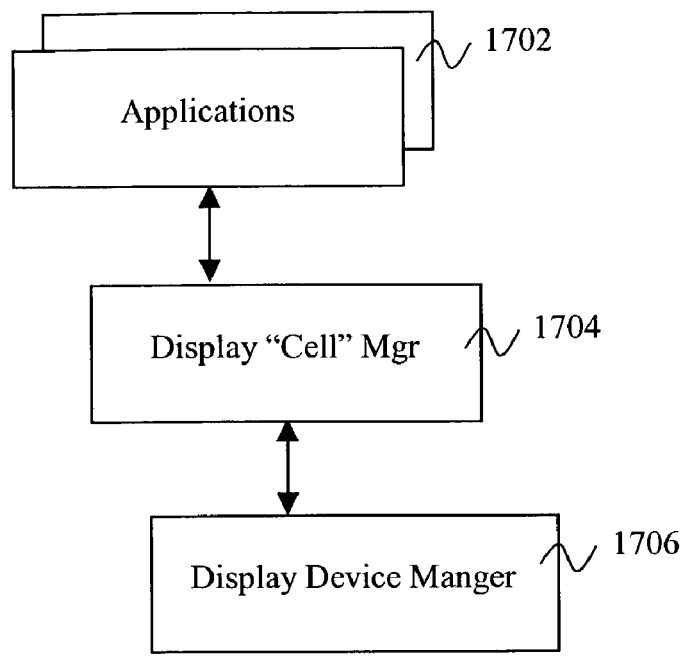
FIGS. 17a–17b illustrate two embodiments for practicing the present invention.

As alluded to earlier, the present invention may be practiced e.g. by endowing an application itself, a cell manager or a window manager with the teachings of the present invention. In the latter cases, a cell/window manager implementor may be effectuated in at least two manners, FIG. 17*a* and FIG. 17*b*. In the embodiment of FIG. 17*a*, cell manager 1704 is equipped with teachings of the present invention interfaces and interacts with applications 1702 using its services, and display device driver 1706 as in the prior art. Accordingly, under this embodiment, typically, the universal region "container" cell 202 is the entire display space of a display device.

Figure 17B:
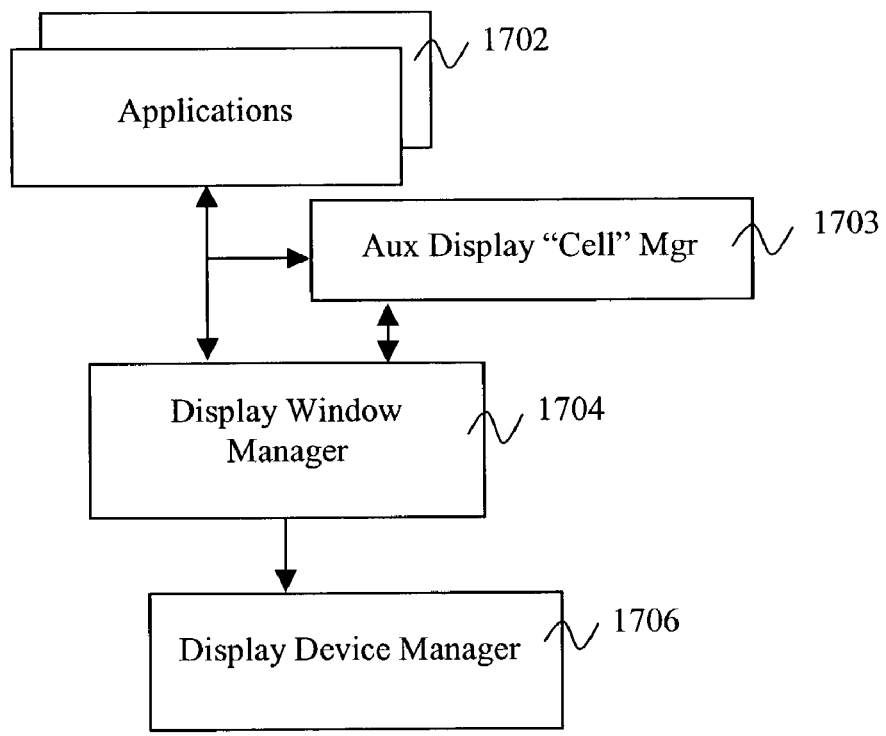

In the alternate embodiment of FIG. 17*b*, the cell manager implementor operates as an "auxiliary" cell manager 1703 to a conventional window manager 1704. Applications 1702 may interact with conventional window manager 1704 directly or indirectly through auxiliary cell manager 1703 (equipped with the teachings of the present invention). Accordingly, universal region "container" cell 202 may be a window of a conventional window approach, except within that window, the EUI is implemented and practiced as earlier described, in accordance with the present invention.

In yet other alternate embodiments, auxiliary cell manager 1703 may be integrally incorporated as part of window manager 1704.

Example Computer System

Figure 18:
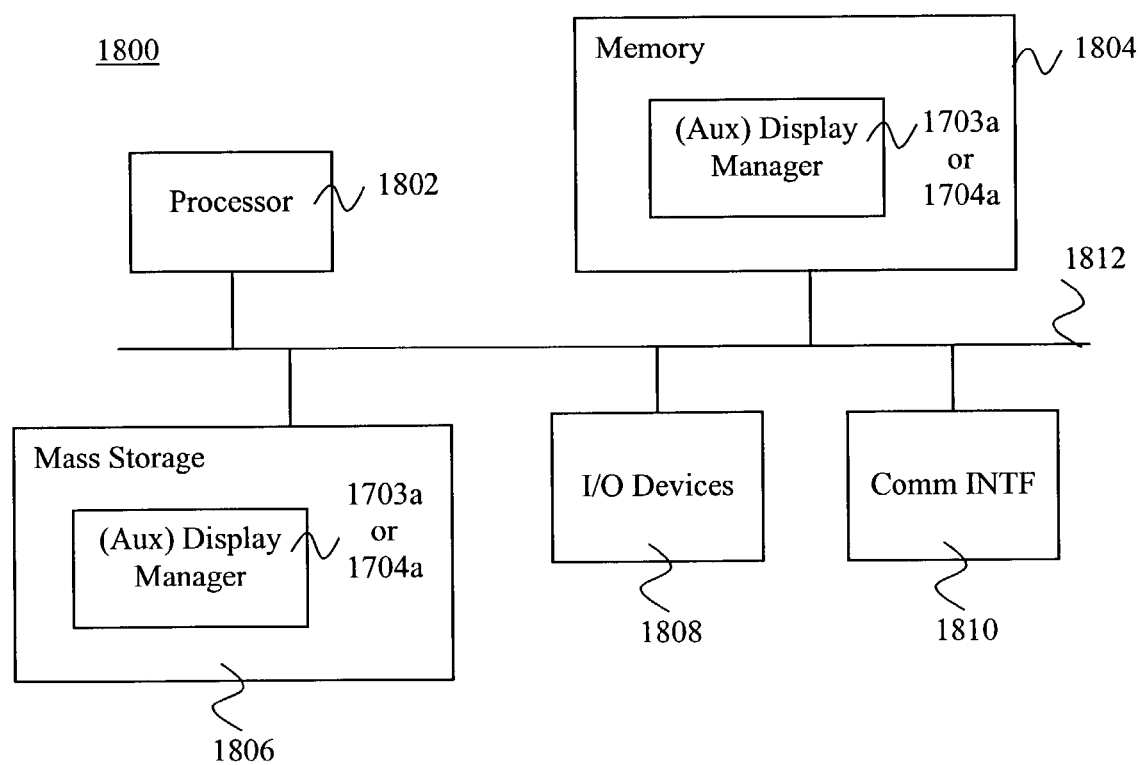
FIG. 18 illustrate an exemplary computing system or device suitable for practicing the present invention.

FIG. 18 illustrates an exemplary computer system or device suitable for practicing the present invention, in accordance with one embodiment. As shown, computer system/device 1800 (hereinafter simply "device") includes one or more processors 1802 and system memory 1804. Additionally, device 1800 includes mass storage devices 1806 (such as diskette, hard drive, CDROM and so forth), input/output devices 1808 (such as keyboard, cursor control and so forth) and communication interfaces 1810 (such as network interface cards, modems and so forth). The elements are coupled to each other via system bus 1812, which represents one or more buses. In the case of multiple buses, they are bridged by one or more bus bridges (not shown). Each of these elements performs its conventional functions known in the art. In particular, system memory 1804 and mass storage 1806 are employed to store a working copy and a permanent copy of the programming instructions implementing the implementor of the present invention, e.g. an application, a cell manager or a window manager. The permanent copy of the programming instructions may be loaded into mass storage 1806 in the factory, or in the field, through a distribution medium (not shown) or through communication interface 1810 (from a distribution server (not shown)). The constitution of these elements 1802–1812 are known, and accordingly will not be further described.

Example Network Environment

Figure 19:
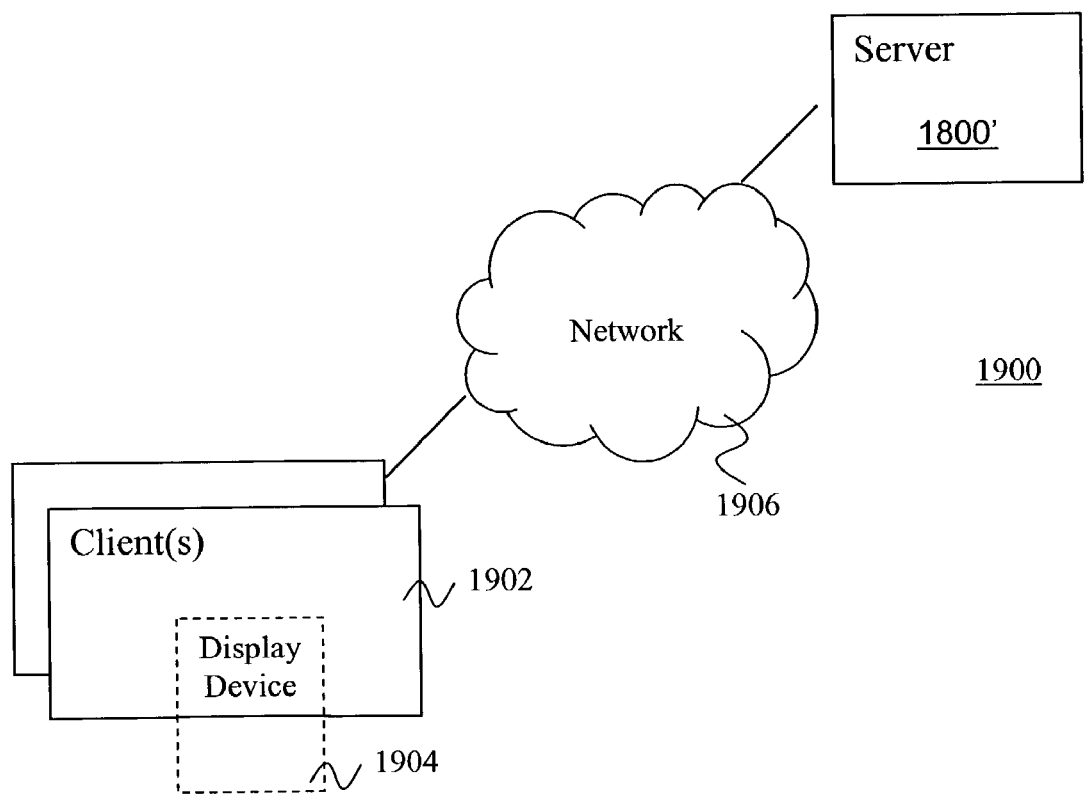
FIG. 19 illustrates an exemplary network environment suitable for practicing the present invention.

FIG. 19 shows an exemplary network environment suitable for practicing the present invention, in accordance with one embodiment. In this embodiment, contents are presented for user of client device 1902 to enjoy, employing the hierarchical cell based EUI 102 of the present invention. In one embodiment, display device 1904*a* on which EUI 102 is rendered, is an integral of client device 1902. In another embodiment, display device 1904*b* on which EUI 102 is rendered, is an separate and distinct "peripheral" of client device 1902.

In various embodiments, the implementor of the present invention, e.g. an application, a cell manager or a window manager, may be executing on client device 1902 itself. In other embodiments, the implementor may be executing on server 1906 instead. Examples of the former case may be a personal computer, an enhanced integrated television set, and a set-top box. Examples of the latter case may be a content streaming server or a cable programming broadcasting device.

Client device 1902 and server 1906 are coupled to each other via one or more private and/or public networks, including e.g. the Internet, employing Digital Subscriber Lines (DSL) (or other variants xDSL), Cable Network, Integrated Digital Service Network (ISDN), Asynchronous Transfer Mode (ATM), Frame Relay, or other high performance communication links/connections of like kind. Communications between client device 1902 and server 1906 may be accomplished via any one of a number of communication protocols known in the art, including but are not limited to the TCP/IP protocol.

Examples of content may include one or more of the following content or program types

| Special Events | News | TV | Sports |
|---|---|---|---|
| Concerts | Live Produced Shows | Reality | Golf |
| Olympics Political Rallies | | Network | Football |
| Amusement Plays | | Syndication Children's TV Treasure Hunts | Racing Football Soccer |

CONCLUSION & EPILOG

Thus, a novel EUI method and apparatus has been described. While the present invention has been described with the foregoing embodiments, the present invention is not so limited. The present invention may be practiced with modifications and extensions to the earlier described embodiments. The full scope of the present invention is defined by the claims to follow.

What is claimed is:

1. An apparatus comprising:
    at least one processor to execute programming instructions; and
    storage medium coupled to at least one processor, having stored therein a plurality of programming instructions to be executed by the at least one processor to enable the apparatus to
        receive a request to perform a selected one of removal and contraction of a selected one of a plurality of display container cells nested within a host display container cell of an end user interface of a display device;
        perform the requested selected one of removal and contraction of the selected one of the nested display container cells, including at least one of
            upsizing one or more of the other nested display container cells to consume all or some of the newly available space within the host display container cell, and
            shifting one or more of the other nested display container cells to reposition one or more of the nested display container cells in view of the newly available space within the host display container cell,
        in view of at least one of
            re-sizing priorities of the other display container cells of said host display container cell, and
            one or more attributes of said host display container cell governing at least one of placement and alignment of immediately nested display container cells.

2. The apparatus of claim 1, wherein said programming instructions further enable the apparatus to perform said upsizing of one or more of the other nested display container cells of the host display container cell by successively upsizing one or more of the other nested display container cells of the host display container cell.

3. The apparatus of claim 1, wherein said programming instructions further enable the apparatus to perform said upsizing of one or more of the other nested display container cells of the host display container cell by successively upsizing one or more of the other nested display container cells of the host display container cell in accordance with their relative priorities.

4. The apparatus of claim 1, wherein said programming instructions further enable the apparatus to perform said shifting of the one or more nested display container cells of the host display container cell by shifting the one or more nested display container cells of the host display container cell relative to one or more of their nearest neighbors.

5. The apparatus of claim 1, wherein said programming instructions further enable the apparatus to perform said shifting of the one or more nested display container cells of the host display container cell by shifting the one or more nested display container cells of the host display container cell relative to one or more boundaries of the host display container cell.

6. An apparatus comprising:
    at least one processor to execute programming instructions; and
    storage medium coupled to at least one processor, having stored therein a plurality of programming instructions to be executed by the at least one processor to enable the apparatus to
        receive a request to expand a selected one of a plurality of display container cells nested within a host display container cell of an end user interface of a display device,
        form one or more extended continuous boundaries of the selected one of the nested display container cells,
        determine expansion impact on one or more neighboring nested displayed container cells using the one or more extended continuous boundaries formed,
        modify the impacted neighboring nested display container cells to accommodate the requested expansion of the selected one of the nested display container cells, and
        expand the selected one of the nested display container cells as requested.

7. The apparatus of claim 6, wherein said programming instructions further enable the apparatus to perform said forming of one or more extended continuous boundary by extending a first boundary of the selected one of the nested display container cells in at least a first direction until the extended first boundary intersect with a boundary of a neighbor nested displayed container cell.

8. The apparatus of claim 6, wherein said programming instructions further enable the apparatus to perform said determining of expansion impact on one or more neighboring nested displayed container cells using the one or more extended continuous boundaries formed by determining expansion impact on neighboring nested display container cells up to at least two degrees removed from the nested display container cell to be expanded.

9. The apparatus of claim 6, wherein said programming instructions further enable the apparatus to perform said modifying of the impacted neighboring nested display container cells to accommodate the requested expansion of the selected one of the nested display container cells by performing for each of the impacted neighboring nested display container cells, at least one of
    downsizing the impacted neighbor nested display container cell, and
    shifting the impacted neighbor nested display container cell.

10. An apparatus comprising:
    at least one processor to execute programming instructions; and
    storage medium coupled to at least one processor, having stored therein a plurality of programming instructions to be executed by the at least one processor to enable the apparatus to
        receive a request to contract a selected one of a plurality of display container cells nested within a host display container cell of an end user interface of a display device,
        form one or more extended continuous boundaries of the selected one of the nested display container cells,
        determine contraction impact on one or more neighboring nested displayed container cells using the one or more extended continuous boundaries formed,
        contract the selected one of the nested display container cells as requested, and modify the impacted neighboring nested display container cells to accommodate the requested contract of the selected one of the nested display container cells.

11. The apparatus of claim 10, wherein said programming instructions further enable the apparatus to perform said forming of one or more extended continuous boundary by extending a first boundary of the selected one of the nested display container cells in at least a first direction until the extended first boundary intersect with a boundary of a neighbor nested displayed container cell.

12. The apparatus of claim 10, wherein said programming instructions further enable the apparatus to perform said determining of contraction impact on one or more neighboring nested displayed container cells using the one or more extended continuous boundaries formed by determining contraction impact on neighboring nested display container cells up to at least two degrees removed from the nested display container cell to be expanded.

13. The apparatus of claim 10, wherein said programming instructions further enable the apparatus to perform said modifying of the impacted neighboring nested display container cells to accommodate the requested expansion of the selected one of the nested display container cells by performing, for each of the impacted neighboring nested display container cells, at least one of upsizing the impacted neighbor nested display container cell, and shifting the impacted neighbor nested display container cell.

* * * * *